Oct. 29, 1929.  W. E. LOVETT  1,733,741
METHOD OF AND MACHINE FOR MAKING PLASTER BOARD
Filed Aug. 3, 1927
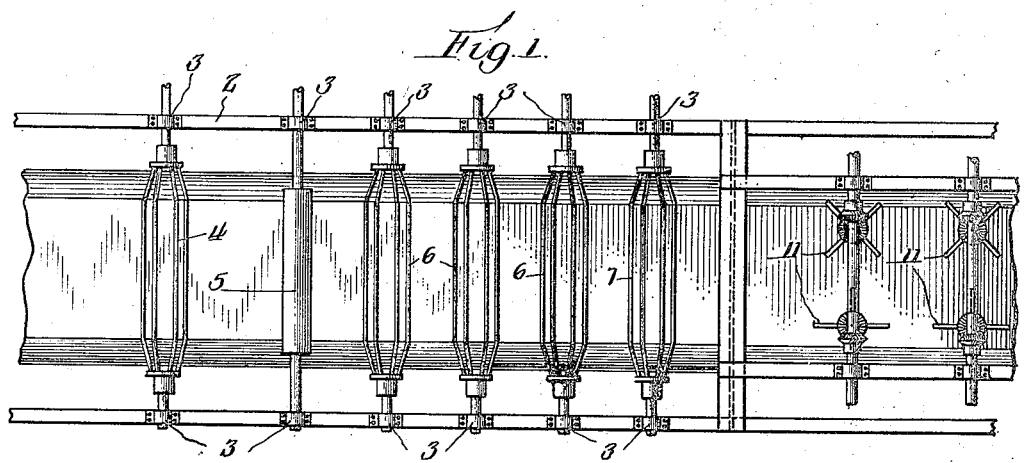
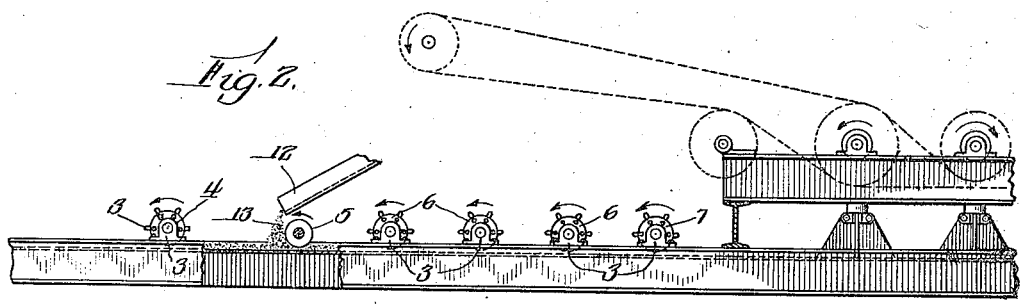
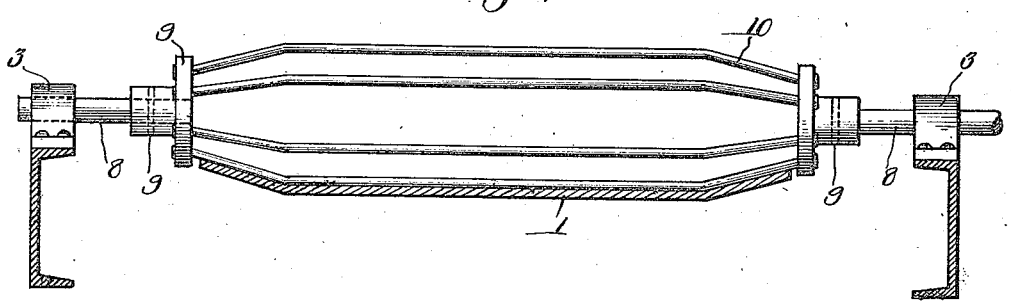
Inventor:-
William E. Lovett
By: Jones, Addington, Ames & Seibold
Attys.

Patented Oct. 29, 1929

1,733,741

UNITED STATES PATENT OFFICE

WILLIAM E. LOVETT, OF PORT CLINTON, OHIO, ASSIGNOR TO UNITED STATES GYPSUM COMPANY, OF CHICAGO, ILLINOIS, A CORPORATION OF ILLINOIS

METHOD OF AND MACHINE FOR MAKING PLASTER BOARD

Application filed August 3, 1927. Serial No. 210,328.

This invention relates to a method of and machine for making plasterboard by the incorporation of foam in the core forming material.

The use of a foam to produce light weight core for plasterboard by using standard machines has met with difficulty. Under the old process if more than one and one-half cubic feet of foam is added to one thousand square feet of board, the use of the excess foam occasionally causes blisters or blankets of bubbles separating the core from the paper cover. This is due to the incomplete incorporation of the foam into the water-stucco mix. Such a condition is serious as it is often not apparent until after the decoration has been applied to the wallboard, when the humidity of the weather and the decorative material causes an expansion of the paper covering of the board which in turn, causes a bulging of the surface, producing a defective wall.

One of the objects of this invention is to provide a means which can be added to the standard machine whereby the quantity of foam added may be increased as required to lessen the weight of the product without danger of blisters hereinbefore mentioned.

The means employed in accordance with this invention consists essentially in the placing of a number of agitators of a rotating cage type and a roller along the mixer belt of the board forming machine. These agitators and the roller are inserted in advance of the mixing fingers of the machine or may do the mixing entirely themselves.

In the drawings Fig. 1 is a plan view of a portion of the mixer belt of a standard board machine showing the agitators and roller in place.

Fig. 2 is a side elevation from the same with parts broken away and

Fig. 3 is a detailed drawing showing the construction of an agitator and its relation to the mixer belt.

The agitators which resemble squirrel cages consist of suitable shafts (8) which are mounted in bearings (3). Attached to the shafts are collars (9) which are drilled to carry the agitating bars (10). The type shown in Fig. 3 shows six of the agitating bars but this number may be varied if necessary to produce other results without departing from the scope of this invention. The entire device consists of the five agitators 4, 6 and the roller 5, the roller being disposed between the agitators 4 and 6 or behind the first agitator.

The cementitious material is placed on the mixer belt (1) and soaked with water while moving toward the mixers. This mixer belt 1 is preferably shaped by rollers not shown, to form a channel for properly retaining the material during the mixing operation and the bars 10 are suitably bent to conform to the shape of the belt 1. As it advances, the agitator (4) rotating at a governed speed gives the material a preliminary whipping. After this pre-agitation the foam is poured on the mix from a suitable spout (12) or similar arrangement and the mass and foam pass under the roller (5) which rotates comparatively slowly or not at all. This roller has the function of spreading the foam equally over the stucco-water mix. This foam is usually made by injecting compressed air into a foam producing water solution;—the method of making this foam, however, forming no part of the present invention. The following cages or agitators thoroughly mix the foam and the stucco-water mix over which it has been spread. From here the mixture passes through the mixing fingers (11) of the standard machine or used as it is, and then through the forming device. The agitation due to the rotating cages and mixing fingers thoroughly incorporates the foam aggregate into the cementitious mixer and prevents the accumulation of foam at the surface. I have found that as much as 6 cubic feet of foam per 1000 square feet of ⅜" wallboard may be safely incorporated in the stucco mix by my improved mixing device.

This whipping and violent agitation of the stucco accelerates the set of the material and by proper control of the speed and number of cages used, the need for accelerator tile may be eliminated.

Having thus described my invention, what I claim is:

1. The method of completely incorporating up to 6 cubic feet of foam per 1000 square feet of ⅜" thick wallboard, which includes wetting a stucco material, mixing said stucco-water mixture, adding a quantity of foam to said mixture, and whipping said stucco-water-foam mixture to secure an even distribution of the foam in said mixture.

2. The method of completely incorporating a relatively large amount of foam into a stucco composition for making wallboard, which includes advancing a mixture of stucco and water on a continuous belt, adding foam to said mixture while being conveyed by said belt and whipping said mixture mechanically while said foam is evenly mixed in said composition.

3. The method of completely mixing foam with a stucco-water mixture, which includes advancing said mixture on a continuous conveyor, continuously supplying said foam to said mixture and mixing said foam with said mixture by a series of rotating bars, the plane of said conveyor being substantially tangent to the path of travel of said bars.

4. In a plasterboard machine, a conveyor adapted to continuously advance a stucco-water mixture, means for continuously introducing foam onto said mixture, and a squirrel cage mixing element adapted to thoroughly incorporate said foam in said mixture.

5. In a plasterboard machine, a conveyor adapted to continuously advance a stucco-water mixture, means for mixing said stucco and water, means for continuously introducing foam onto said mixture and conveyor, and means for mixing said foam with said mixture as said mixer is continuously advanced by said conveyor.

6. In a plasterboard machine, a conveyor adapted to continuously advance a stucco-water mixture, means for continuously introducing foam onto said mixture and conveyor, and a series of bars moving continuously in a circular path so as to mix the foam with said mixture, the plane of said conveyor being substantially tangent to the path of movement of said bar.

7. In a plasterboard machine, a conveyor adapted to continuously advance a stucco-water mixture, means for continuously introducing foam onto said conveyor, roller means adapted to spread said foam evenly on top of said mixture, and a squirrel cage mixing element adapted to thoroughly incorporate said foam in said mixture.

8. In a plasterboard machine, a conveyor adapted to continuously advance a stucco-water mixture, means for continuously introducing foam onto said mixture and conveyor, and a plurality of squirrel cage mixing devices adapted to mix said mixture before and after the introduction of said foam.

9. In a plasterboard machine, a conveyor adapted to continuously advance a stucco-water mixture, means for continuously introducing foam onto said conveyor, a squirrel cage mixing device comprising a series of bars adapted to move in a circular path so as to mix said foam with said mixture, the plane of said conveyor being substantially tangent to said circular path, and a plurality of mixing elements adapted to rotate in a plane substantially parallel to the plane of said conveyor.

10. In a plasterboard machine, a conveyor adapted to continuously advance a stucco-water mixture, means for continuously introducing foam onto said conveyor, a mixing device comprising a series of bars adapted to move in a circular path so as to mix the stucco and water before the introduction of said foam and a similar mixing device adapted to mix the foam with said stucco-water mixture after the introduction of said foam onto said conveyor.

In witness whereof, I have hereunto subscribed my name.

WILLIAM E. LOVETT.